United States Patent [19]
Keske

[11] Patent Number: 5,763,561
[45] Date of Patent: Jun. 9, 1998

[54] POLYAMIDE COMPOSITIONS HAVING IMPROVED THERMAL STABILITY

[75] Inventor: Robert G. Keske, Gainesville, Ga.

[73] Assignee: Amoco Corporation, Chicago, Ill.

[21] Appl. No.: 863,778

[22] Filed: May 27, 1997

Related U.S. Application Data

[60] Provisional application No. 60/025,329, Sep. 6, 1996.

[51] Int. Cl.$^6$ .......................... C08G 73/10; C08G 69/28
[52] U.S. Cl. .............. 528/310; 528/322; 528/332; 528/336; 528/338; 528/339; 528/340; 528/342; 528/347; 528/349
[58] Field of Search ................. 528/310, 322, 528/336, 338, 339, 340, 342, 347, 349, 332

[56] References Cited

U.S. PATENT DOCUMENTS

| | | | |
|---|---|---|---|
| Re. 34,447 | 11/1993 | Poppe et al. | 24/606 |
| 3,457,325 | 7/1969 | Anton | 260/857 |
| 3,639,335 | 2/1972 | Fujii et al. | 260/45.75 |
| 4,163,101 | 7/1979 | Schade et al. | 528/347 |
| 4,603,193 | 7/1986 | Richardson et al. | 528/342 |
| 4,818,793 | 4/1989 | Matthies et al. | 525/183 |
| 4,831,108 | 5/1989 | Richardson et al. | 528/335 |
| 4,937,276 | 6/1990 | Nielinger et al. | 524/136 |
| 5,081,222 | 1/1992 | Reimann et al. | 528/324 |
| 5,106,946 | 4/1992 | Clark, III et al. | 528/335 |
| 5,109,106 | 4/1992 | Lahary et al. | 528/349 |
| 5,112,685 | 5/1992 | Rashbrook et al. | 428/364 |
| 5,218,082 | 6/1993 | Reimann et al. | 528/339 |
| 5,245,005 | 9/1993 | Schwier et al. | 528/336 |
| 5,252,661 | 10/1993 | Reimann et al. | 524/514 |
| 5,286,839 | 2/1994 | Chen | 528/344 |
| 5,288,793 | 2/1994 | Chen | 524/606 |
| 5,298,595 | 3/1994 | Reimann et al. | 528/324 |
| 5,322,923 | 6/1994 | Lahary et al. | 528/349 |
| 5,378,800 | 1/1995 | Mok et al. | 528/340 |
| 5,387,645 | 2/1995 | Montag et al. | 525/66 |
| 5,422,420 | 6/1995 | Shridharani | 528/340 |
| 5,447,980 | 9/1995 | Reichmann | 524/413 |
| 5,500,473 | 3/1996 | Wissmann | 524/447 |
| 5,504,146 | 4/1996 | Goetz et al. | 524/607 |
| 5,516,882 | 5/1996 | Soelch | 528/340 |

OTHER PUBLICATIONS

Eur. Polym. J. vol. 21, No. 10, pp. 891–894 (1985) Thermo-Oxidation of Lactam Polymers Related to the Conditions the month of the date of publication is not available.

Eur. Polym. J. vol. 22, No. 3, pp. 199–202. (1986) "The Effect of Carboxylic and Basic End Groups on the Thermo-Oxidation of Hydrolytic Polymers of Lactams", the month of the date of publication is not available.

J.M.S. Pure Appl. Chem A30(9 & 10) pp. 669–678 (1993) "Effect of Polymerization Conditions on the Thermooxidation of Nylon 6", the month of the date of publication is not available.

*Primary Examiner*—P. Hampton-Hightower
*Attorney, Agent, or Firm*—Thomas E. Nemo; Stephen L. Hensley

[57] ABSTRACT

Improved high temperature polyamides, and particularly partially aromatic polyamides, containing less than about 40 µeq/g carboxylic acid endgroups, when stabilized with a copper-containing thermal stabilizer, the polyamides exhibit improved thermal oxidative stability.

11 Claims, No Drawings

POLYAMIDE COMPOSITIONS HAVING IMPROVED THERMAL STABILITY

This application claims the benefit of U.S. Provisional Application No. 60/025,329, filed Sep. 6, 1996.

BACKGROUND OF THE INVENTION

This invention relates to polyamides, and more particularly to improvement in thermally stabilized polyamide compositions. Still more particularly, the invention is directed to formulations comprising partially aromatic polyamides having improved thermal stability for use in combination with thermal oxidative stabilizers, particularly copper-containing stabilizers. The invention may be further described as a method for improving the thermal stability of partially aromatic polyamide injection molding resins containing copper(I) stabilizer by reducing the level of carboxylic acid endgroups in the polyamide.

Polyamides generally exhibit a balance of thermal, strength and stiffness properties which make them suitable for many applications. The resins are particularly attractive for use in applications where resistance to chemical and thermal attack is required. Aliphatic polyamides, termed nylons, generally are readily processed thermally and have gained wide acceptance in the molding arts and in the extrusion arts, including fiber spinning and film extrusion. Many such polyamides find use in the form of yarn as tire cord and other applications where high tenacity and low shrinkage are needed.

Partially aromatic polyamides and copolyamides have been developed for use in high temperature applications, and crystalline and semi-crystalline copolyamides comprising at least about 40 mole % partially aliphatic terephthalamide units are known for their particularly good thermal properties and performance in demanding environments. However, such polyamides have relatively high melting points e.g., about 290° C. or higher, and the degradation temperatures for some do not greatly exceed their melting points; accordingly, requirements for melt processing these polyamides are more rigorous and complex than those for polyamides such as nylon 6,6, melting at about 260°-265° C.

Fabricating high temperature, partially aromatic polyamides for the production of molded articles, extruded profile goods, laminates or the like, particularly when filled, requires processing the resin at temperatures very near the resin decomposition temperature, together with severe shear stress during molding or extrusion operations. Melt spinning operations such as are disclosed and described in U.S. Pat. No. 5,106,946 for producing fiber and yarn subject the resin to severe stress through application of high shear at high temperatures. Drawing operations at elevated temperatures, often used with fiber and film to develop crystallinity, may expose the resin to dry heat for extended periods. Good thermal stability is thus critically important to attaining good properties as well as to maintaining those properties in a variety of uses, particularly in demanding environments.

The art of stabilizing resins against deterioration through exposure to thermal oxidative environments is well developed. The decomposition of aliphatic polyamides has been the subject of a great many studies, and numerous additives have been proposed for improving their thermal oxidative resistance, both during processing and while in use. Stabilizers act to inhibit the oxidation processes, preserving the aliphatic polyamide chain intact. The short-term thermal stability needed for most processing may be realized by incorporating a hindered phenolic antioxidant such as di-tertiary butyl cresol or any of the closely-related compounds and derivatives commonly used in the resin arts for these purposes. Stabilizer compositions comprising copper (I) halide and an alkali metal halide are also described in the art for use with polyamides, and the use of complex compounds comprising copper salts and diamines has also been disclosed for use with polyamide filaments. See U.S. Pat. No. 3,639,335. Dispersions of solid cuprous phthalate and potassium iodide have been used at levels corresponding to ca. 60 ppm copper to stabilize filaments comprising nylon 6,6 and copolymers thereof comprising minor amounts of hexamethylene isophthalamide, as shown in U.S. Pat. No. 3,457,325. Heat stabilizers comprising combinations of copper halides, alkali metal halides and phosphorus compounds have been employed for use in polyamide molding resins and the like, as shown for example in U.S. 4,937,276.

The aliphatic segments of high temperature, partially aromatic polyamides are subject to the same thermal-oxidative decomposition processes, and the thermal stabilizers for aliphatic polyamides have also been found useful with these polyamides. However, because partially aromatic polyamides generally require higher processing temperatures and otherwise are likely to be subjected to more severe conditions, the compounder may often find it necessary to use higher levels of stabilizers to adequately stabilize these high temperature polyamides.

Other modes of thermal oxidative attack may also occur in high temperature, partially aromatic polyamides. The aromatic acid moiety may undergo thermal decarboxylation, particularly at elevated temperatures, producing bubbles and voids in the molding. Stabilizers commonly employed with aliphatic polyamides may partially decompose thermally during processing at these elevated temperatures and form gaseous products that detrimentally affect the properties or appearance of molded and extruded goods. Where substantial degradation occurs, these byproducts may also result in splay formation in molded articles.

Copper compounds are known to be particularly facile aromatic acid decarboxylating agents, and adding such stabilizers to inhibit oxidation of the aliphatic portion of the polyamide may in fact promote thermal decomposition of the aromatic portion of the polymer. Melt extrusion, injection molding and melt spinning formulations that contain these stabilizers can cause polymer degradation with concomitant discoloration and substantial bubble formation. Minor amounts of additional components have been found to improve the thermal stability of copper-stabilized polyamides. See U.S. Pat. No. 5,447,980.

The art has continued to seek more effective stabilizing formulations for high temperature, partially aromatic polyamides. Though greater levels of stabilizers in combination with additional inhibiting compounds may be found to adequately stabilize aliphatic polyamide resins, these approaches likely will significantly increase costs, thereby tending to limit commercial acceptability. Moreover, the presence of additives, particularly in substantial quantities, often detrimentally affects the balance of mechanical properties of articles made from such formulations.

The art has not recognized the possibility of improving thermal stability by controlling the balance of endgroups or by using endcapping reactions to reduce the number of acid and amine endgroups when use of a copper-based thermal oxidative stabilizer is contemplated. For example, terephthalic acid:isophthalic acid:hexamethylenediamine copolymers are disclosed in U.S. Pat. No. 4,818,793, but there is no mention of the relative number of endgroups or of the use of endcap to reduce the number of acid and amine endgroups. In U.S. Pat. Nos. 5,081,222; 5,252,661; and 5,504,146 there are disclosed copolymers comprising terephthalic acid:hexamethylenediamine units in combination with caprolactam and/or adipic acid:hexamethylenediamine units, but there is no mention of the use of endcap to reduce the total number of acid and amine endgroups, and the polymers exemplified are said to contain approximately equivalent numbers of carboxyl and amino endgroups. In U.S. Pat. No. 5,109,106 the preparation of copolyamides from terephthalic acid and isophthalic acid or mixtures thereof with 2-methylpentamethylenediamine and optionally 2-ethyl-1, 4-tetramethylenediamine is disclosed. These copolymers were characterized as having relative numbers of carboxyl and amino endgroups that were within 80 µeq/g of each other and, by the fact that chain-limiting endgroups of the cyclic amine type were generally below 40 µeq/g, again showing no contemplation of controlling the level of carboxyl endgroups.

The preparation of copolyamides from terephthalic acid with mixtures of hexamethylenediamine, 2-methylpentamethylenediamine and optionally 2-ethyl-tetramethylenediamine is disclosed in U.S. Pat. No. 5,322,923. Although the patent describes analytical methods for determining endgroup content of the resins, stoichiometric control is limited to adjusting for amines losses encountered during the process. There is no mention of specific endgroup control, other than to limit the formation of cyclic amine endgroups. The preparation of copolyamides from terephthalic acid, optionally in combination with isophthalic acid, and mixtures of hexamethylenediamine and 2-methylpentamethylenediamine is disclosed in U.S. Pat. Nos. 5,378,800 and 5,500,473. Although numerous preparation examples are given, there is no specific mention of endgroup control.

The complexity of polyamide thermal oxidation processes is shown, in part, by the work of B. Lanska and J. Sebenda for lactam polymer samples where the oxidation mechanism was not diffusion limited. In *Eur. Polym. J.* Vol. 21, No. 10, pp. 891–894 (1985), the therno-oxidation of lactam polymers at relatively low temperatures, 140° C., was found to be related to the polymerization conditions and secondary reactions and structures occurring during polymerization at temperatures above 250° C. In extending this lactam work (*Eur. Polym. J.* Vol. 22, No. 3, pp. 199–202 (1986)), along with an investigation of fibers from lactam polymers (*J.M.S.-Pure Appl. Chem.*, A30 (9&10), pp. 660–678 (1993) ), numerous conditions were said to influence the stability. Polymers prepared with acid catalysis were the least stable while base catalysis yielded the most stable polymers. Extraction of the catalysts actually reversed the relative stability of the two polymers. When equimolar amounts of endgroups were present, increasing the levels of both endgroups increased stability. When an excess of acid groups were present, exposure to oxidation conditions resulted in an increase in the number of acid groups and rapid degradation. When an excess of amine groups were present, exposure to oxidation conditions resulted in a decrease in the number of amine groups and slower degradation. Polymerization conditions in excess of 230° C. led to a rapid decrease in stability, presumably due to products of side reactions.

Methods and compositions for providing adequately stabilized, high temperature polyamide resins that permit the compounder to use lesser amounts of stabilizing additives would provide a significant cost advantage over present stabilization methods. Further, with reduced levels of additives present, still further advantages may be seen including improvement in the overall balance of mechanical properties, thereby increasing the acceptability of such polyamides for a wider range of uses.

BRIEF SUMMARY OF THE INVENTION

This invention is directed to partially aromatic polyamide compositions having improved thermal stability. More particularly the invention is directed to methods for improving the thermal stability of partially aromatic, high temperature polyamides and to the improved copper-stabilized polyamide injection molding resins therefrom. Formulations comprising improved high temperature, partially aromatic polyamides according to the invention in combination with a copper-containing stabilizer composition exhibit excellent thermal stability at significantly reduced levels of stabilizer additives. The invented formulations are particularly desirable in the manufacture of injection molded and extruded goods intended for extended use in demanding environments and at elevated temperatures and where resistance to chemical and thermal attack is an important consideration.

DETAILED DESCRIPTION OF THE INVENTION

The improved polyamide injection molding resins and compositions according to the teachings of this invention comprise an improved, partially aromatic polyamide together with a conventional copper-containing stabilizer composition. By partially aromatic polyamide is meant a polymer containing units derived from one or more aliphatic diamines and one or more aromatic dicarboxylic acids, including copolymers containing such units.

The polyamides suitable for use in the practice of this invention include the various linear, thermoplastic, high temperature, partially aromatic polyamides and copolymer analogs thereof, frequently termed partially aromatic nylons, that require high processing temperatures and are thus difficult to melt process without deterioration. Polyamides that are crystalline or crystallizable are preferred, and particularly preferred are the crystalline or semi-crystalline, high temperature copolyamides comprising terephthalamides of aliphatic diamines. Such copolyamides will comprise as structural units terephthalamides of one or more $C_4$–$C_{14}$ aliphatic diamines such as hexamethylene diamine or the like, including diamines having one or more $C_1$–$C_4$ alkyl substituents attached to the hydrocarbon portion. In addtion to the terephthalamide units, these copolyamiides may further comprise as structural units one or more additional diamides of such aliphatic diamines, for example diamides derived from aromatic dicarboxylic acids or related compounds such as isophthalic acid, naphthalene dicarboxylic acid or the like, as well as diamides derived from aliphatic diamines and $C_4$–$C_{14}$ aliphatic dicarboxylic acids or related compounds such as diamide units derived from adipic acid, sebacic acid, cyclohexane dicarboxylic acid and similar dicarboxylic acids. It is well known that the crystallizability of polyterephthalamides may be detrimentally affected by the presence of additional structural units such as, for example, isophthalamide units, and the presence of such units in the copolymer at high levels may render the polyterephthalamide noncrystallizable and thereby amorphous. Hence, where a high degree of crystallinity in the polyamide and rapid crystallization are important considerations, it will be desirable to avoid the use of additional diamide units that are known to affect crystallizability or to employ such units at a level that will not prevent crystallization.

A variety of polyamides comprising terephthalamide units are known in the art, and copolyamides comprising a combination of hexamethylene terephthalamide units and hexamethylene adipamide units, optionally including hexamethylene isophthalamide units, are also well known. Particularly desirable for use in the practice of this invention are copolyamides comprising at least 40 mole % hexamethylene terephthalamide units, the balance being hexamethylene adipamide units, either alone or in combination with up to about 30 mole % hexamethylene isophthalamide units. Also useful for these purposes are the well-known crystallizable polyamides comprising terephthalamides of two or more diamines such as hexamethylene diamine and 2-methyl-pentamethylene diamine.

In greater detail, the polyamide component of the invented compositions may be a crystallizable polyamide comprising at least about 40 mole %, preferably from about 40 to 100 mole %, recurring aliphatic diamine terephthalamide units which may be further described as represented by the following structural formula:

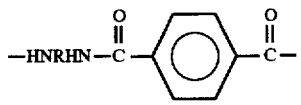

wherein R comprises at least one aliphatic hydrocarbyl radical.

Preferably, aliphatic radicals R in the above formula will comprise at least one straight chain, branched or cyclic, substituted or unsubstituted aliphatic radical having from about 4 to about 14 carbon atoms. Polyamides comprising such radicals exhibit good crystallinity and desirable high temperature properties, together with melting and thermal degradation temperatures making them well suited for melt processing and fabricating in injection molding and extrusion operations. Specific examples of suitable aliphatic radicals include tetramethylene, hexamethylene, dodecamethylene and the like, as well as their alkyl-substituted analogs such as 2-methylpentamethylene, 2,4-dimethylhexamethylene and the like, and cyclic analogs such as p-cyclohexyl and the like. Most preferably, R in the formula comprises a hexamethylene radical, either alone or as mixture with additional aliphatic 4 to 14 carbon atom radicals. The preferred polyamide components will have a melting point of at least about 270° C. as a result of the high content of terephthalamide units; still more preferred are polyamide components melting at about 290° C. to about 330° C.

The polyamides may be more particularly described as crystallizable or semi-crystalline partially aromatic polyamides of fast or intermediate crystallization rate comprising recurring units corresponding to structural formulas A, B and C as shown below in proportions of about 40 to about 100 mole % A, 0 to about 35 mole % B and about 0 to about 60 mole % C.

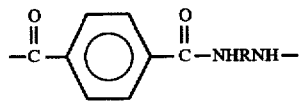

A

-continued

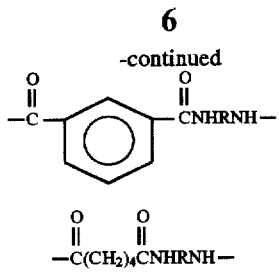

In the above formulas, R comprises at least one aliphatic hydrocarbyl radical as described hereinabove, and may represent a mixture of aliphatic 4 to 14 carbon radicals; the mole ratio of the units A, B and C may lie in the range of from about 40–100:35–0:60–0.

More preferred among such polyamides are those wherein the mole ratio of the units A, B and C lies in the range of from about 40–90:35–0:60–5, and still more preferable are those within the range of from about 40–70:25–0:60–5, because such compositions exhibit excellent thermal and mechanical properties. Such polyamides have melting points of about 300° to about 350° C., glass transition temperatures ($T_g$) of about 90 to about 130° C. and inherent viscosities generally ranging from about 0.7 to about 1.4 dl/g, with about 0.8 to about 1.2 dl/g being preferred from the standpoint of properties of molded parts and ease of molding.

Especially preferred among such polyamides are those wherein R in the above formulas comprises hexamethylene. Also highly suitable as the polyamide component of the invented compositions are polyamides comprising two of the units A, B and C shown above, such as those with mole ratios of A:B:C in the range of from 40–65:0:60–35. For example, polyamides containing A, B and C units at ratios of 45:0:55, 60:0:40, 65:0:35 and 55:0:45 are widely known and described in the art, while terpolymers with minor amounts of the isophthalamide component B, for example in mole ratios such as 50:5:45, 40:5:55 and the like, may be found particularly desirable for use where lower melt temperatures will be encountered.

Other copolymers comprising terephthalamide units are known and have been described in the art, and these may also be found useful. For example, copolymers comprising terephthalamide units and units derived from lactams such as, for example, the widely known copolymers of hexamethylene terephthalamide and caprolactam and terpolymers comprising hexamethylene terephthalamide, hexamethylene adipamide and units derived from caprolactam have been available from commercial sources.

These and other suitable partially aromatic polyamide and copolyamide resins are fully described in the art, for example, in U.S. Pat. Nos. 4,831,108; 5,112,685; 4,163,101 and Re.34,447, and in U.S. Pat. Nos. 5,288,793, 5,378,800; 5,322,923 and 5,218,082; the teachings of these patents and applications are hereby incorporated herein by reference. Partially aromatic polyamides are readily prepared using processes known and described in the art such as, for example, the continuous and batch processes set forth in U.S. Pat. Nos. 4,603,193; Re. 34,447 and 5,387,645, and a variety of suitable copolyamides are readily available from commercial sources. The term "polyphthalamide" as set forth in ASTM D5336-93 is reserved for polyamides wherein the combined content of terephthalamide and isophthalamide units is at least 60 mole %. However, through common use in the art the term has become widely associated with any polyamide that contains phthalamide units, irrespective of the amount of such units or whether the units are terephthalamide or isophthalamide units.

The molecular weight of the polyamide will be generally selected to meet the requirements of the particular end use envisioned and of the processing methods contemplated for the fabrication, according to practices widely known in the resin arts. For example, fiber grade polyamides will be best suited when fiber and filament uses are contemplated, while those identified by the art as extrusion grade and injection molding grade resins will be employed for those uses. Such resins may be further described as generally having inherent viscosities greater than about 0.6, preferably greater than about 0.7, when measured at 30° C. in a 60/40 phenol/ tetrachloroethylene (TCE) mixture at a concentration of 0.4 g/dl. Although there is no particular upper limit for molecular weight to be suitable for use in these compositions, very high molecular weight polyamides, those with an inherent viscosity as great as 2.0 dl/g or even greater, may be extremely difficult to process thermally, and hence will not be preferred.

For the purposes of this invention the polyamides will be prepared to have a low level of carboxylic acid endgroups. Generally, polyamides are prepared by condensation reactions of diamines such as hexamethylene diamine with dicarboxylic acids such as adipic acid, terephthalic acid or the like. Polyamides may also be produced from suitable monomeric compounds having both amine and carboxylic acid functionality, such as by polymerization of caprolactam or of an amino acid. The resulting polyamides generally will contain amine terminal groups and carboxylic acid terminal groups. When prepared using a stoichiometric balance of diamine and dicarboxylic acid then, absent side reactions occurring during the polymerization, the resulting resin will have a substantial balance of amine and carboxylic endgroups. Where an excess of one of the monomers is employed, or where reactive endcapping agents are added, one endgroup may predominate. For example, polymerizing a diamine-rich monomer mixture will result in a polymer with a greater number of amine endgroups. Alternatively, an amine-reactive endcapping agent such as acetic acid may be employed to react with a portion of the terminal amine functionality present, thereby reducing the proportion of such endgroups in the resulting polyamide.

It is necessary that only a relatively minor excess of the monomer, whether diamine or dicarboxylic acid, or of an endcapping agent be employed in the polymerization. The total number of endgroups, including those that bear the endcapping agent if one is used, will be a function of the degree of polymerization, more particularly a function of the number average molecular weight of the final polymer. As is well understood in the condensation polymer arts, the degree of polymerization at completion will be determined by the extent of the imbalance or by the amount of capping agent; therefore, only a minor excess of monomer or small amounts of capping agent, generally on the order of up to about 5 mole %, preferably no more than about 2 mole %, will be employed in order to avoid reducing the polymer molecular weight to an undesirably low level.

As will be seen, polyamides employed in the illustrative examples typically have, in total, approximately 140–170 µq/g of endgroups. For use in the practice of this invention, the level of carboxylic endgroups will be low, generally no greater than 25% of all endgroups or about 40 microequivalents per gram (µeq/g), preferably no greater than 25 µeq/g. Partially aromatic polyamides with acid endgroup levels of from 25 µeq/g to as low as 10 µeq/g or even 5 µeq/g will be found particularly useful in the practice of this invention, as will polyamides without detectable levels of carboxylic endgroups. Polyterephthalamides that heretofore have been described in the art, including those widely available from commercial sources, are prepared having high levels of carboxylic endgroups, generally greater than about 50 µeq/g. Polyamides with these high levels of carboxylic acid generally require the use of very high levels of stabilizer additives to attain acceptable thermal oxidative stability for use as molding compositions.

Polyamides having a low level of carboxylic acid endgroups together with the desired molecular weight may conveniently be produced through use of an amine-rich stoichiometry as described, together with an appropriate molar amount of amine-reactive endcapping agent. The combined level of amine endgroups and endcapped terminal groups in the resulting polymer will then be comparatively high. It is well known that deamination and other side reactions occur in these condensation reactions and these may introduce additional molecular weight-limiting terminating species as well as cause branching and crosslinking. It is therefore necessary to carefully control the polymerization process and to achieve a high degree of completion in order to provide polyamides having the intended molecular weight together with the desired level of carboxylic endgroups.

Compounding and fabricating operations using thermal processing means may lead to further changes in molecular weight and in endgroup content. For example, the presence of minor amounts of water may cause hydrolysis and chain cleavage, together with production of additional amine and carboxylic acid endgroups; thermal decarboxylation reactions remove carboxylic acid groups from aromatic moieties and, in terephthalamides, produce benzamide endcapped terminations; further condensation of amine terminal groups with carboxylic acid terminal groups will increase molecular weight and reduce the level of both terminating species. The thermal stability of the polyamide thus will depend in part upon the carboxylic acid endgroup content at the time of each thermal processing step, and maintaining that content at a level below about 40 (µeq/g) throughout compounding and processing of the resin, as well as in recycle of scrap, becomes an important consideration. Alternative methods may also be devised for control of the carboxylic acid endgroup level such as, for example, through use of suitable carboxylic acid-reactive endcapping agents or through means of a post-reaction of the carboxylic endgroups. These and other alternative low carboxylic acid endgroup polyamides are also to be considered as falling within the scope of this invention.

Alternative methods may also be devised for control of the carboxylic acid endgroup level such as, for example, through use of suitable carboxylic acid-reactive endcapping agents or through means of a post-reaction of the carboxylic acid endgroups. These and other alternative low carboxylic acid endgroup polyamides are also considered as falling within the scope of the invention.

The improved polyamides will be used in combination with a copper-containing stabilizer in preparing resin compositions according to the practice of this invention. Copper-containing stabilizers that may be used for these purposes may be further characterized as comprising a copper compound soluble in the polyamide and an alkali metal halide. More particularly, the stabilizer will consist essentially of a copper(I) salt, for example cuprous acetate, cuprous stearate, a cuprous organic complex compound such as copper acetylacetonate, a cuprous halide or the like, and an alkali metal halide. Preferably, the stabilizer will consist essentially of a copper halide selected from copper iodide and copper bromide and an alkali metal halide selected from the group consisting of the iodides and bromides of lithium, sodium and potassium. Stabilizing formulations comprising copper(I) iodide and potassium iodide are well known and widely available commercially for use in stabilizing aliphatic polyamides including nylon 6, nylon 6,6 and the like and may be particularly useful in the practice of the invention.

According to the practice in the art, the amount of the copper-containing stabilizer will be selected to provide a level of from about 50 to about 1000 ppm copper. The weight ratio of the alkali metal halide to copper(I) halide will preferably lie in the range of from about 2.5:1 to about 20:1, and most preferably from about 8:1 to about 10:1. Generally, the combined weight of copper compound and alkali metal halide in the stabilized polyamide will amount to 0.01 to about 2.5 wt %, preferably from about 0.1 to about 1.5 wt %, based on the combined weight of polyamide and stabilizer.

The invented compositions may be used in the production of injection molded articles, or fabricated using any of a variety of processes and methods well-known and widely practiced in the fabricating arts, e.g. melt spinning of fibers, extrusion of sheet, tubing or film and the like. The compositions may also be used as matrix materials or binders for composite or laminated structures and may be further compounded with from 5 to 60 wt % of one or more fillers including reinforcing fillers and the like for use in providing molded articles intended for use in severe environments. Suitable as reinforcing agents are glass fibers and carbon fibers including graphitic fibers. Metal fibers, alumina and aluminum silicate fibers, aluminum oxide fibers, rock wool fibers and the like may also be found useful for particular applications. Representative filler materials include particulate and powdered forms of calcium silicate, silica, clays, talc, mica, carbon black, titanium dioxide, wollastonite, polytetrafluoroethylene, graphite, alumina trihydrate, sodium aluminum carbonate, baryte and the like.

The stabilized compositions of the present invention may be further compounded to include up to about 60 wt % of various additives to improve or modify various chemical and physical properties. Examples of such additives include flame retardants, additional stabilizers and anti-oxidants, processing aids, colorants, and the like according to common practice. The appropriate types and levels of such additives will depend on processing techniques and on the end use of the resultant product, and can be determined by those skilled in the art.

Compounding may be accomplished using any of the variety of compounding and blending methods well-known and commonly used in the resin compounding arts. Conveniently, the polyamide and stabilizer, and fillers and modifying components, if any, may be used in powder, pellet or other suitable form. The components will be melt compounded at temperatures effective to render the resinous components molten using a high shear mixer, e.g., a twin-screw extruder, to obtain a desirably uniform blend. The components may be first combined in solid form, such as powder or pellets, prior to melt compounding to facilitate mixing. Particulates, fibers and other additives may be incorporated into one or more of the components prior to combining with the remaining components, or the components may be physically mixed in powder or pellet form using conventional dry-blending methods and then extrusion compounded. Plasticating the resin in a compounding extruder and feeding the additives, particulates or fibers to the molten composition through a port in the extruder as is also commonly practiced in the art may be found useful in compounding the compositions of this invention.

The present invention will be better understood by consideration of the following examples provided to demonstrate particular embodiments thereof.

EXAMPLES

Polyamide Preparations

The polyamides used in the following examples are summarized in Table I below. The continuous process used in preparing polyamides employed in these examples may be generally described and summarized as follows:

A large, steam-heated, stainless steel, stirred salt reactor was charged with the monomers and, when appropriate, water to provide an aqueous mixture of reactants such that the final polymers have the approximate mole ratios shown in Table I below. The mole ratio of total diamine to total acids was selected in each case to provide polyamides having a balanced, an amine-rich or an acid-rich stoichiometry as desired, and acetic acid was added as a capping agent in the amounts shown. Since the polymerizations were run without recycle of volatiles, excess reactant, particularly acetic acid, diamines and, where appropriate, caprolactam, was employed to offset volatilization losses. The catalyst, sodium hypophosphite or phosphorous acid, was added to the reactor either as a solid or aqueous solution at levels to provide 400 ppm ($NaH_2PO_3$) or 125 ppm (H3PO3) phosphorus in the final polymer and the reactor was then sealed, purged with nitrogen, pressurized to about 2.8 kg/cm$^2$ (40 psig) with nitrogen, heated to about 120° C. and held at that temperature.

Contents of the salt reactor were pumped continuously to a jacketed, oil-heated concentrator fitted with a Research Control Valve to vent volatiles, and maintained under pressure of about 11.3–13.1 kg/cm$^2$ (160–185 psig) while heating the contents to about 220°–225° C. The water content of the reaction mixture exiting the concentrator was reduced to less than about 15 wt % using a residence time of about 15 minutes. The reaction mixture was continuously pumped from the concentrator to and through two oil-heated, stainless steel preheaters, arranged in series. The melt temperature at the exit of the first preheater was selectably maintained at about 279°–290° C. and in the second at about 282°–293° C.; a Research Control Valve was used to maintain the pressure in the preheaters at about 127 kg/cm$^2$ (1800 psig).

The reaction mixture exited the preheater continuously through the Research Control Valve into a jacketed tubular reactor at a pressure of about 7 kg/cm$^2$ (100 psig) heated to wall temperature of about 325°–345° C. by circulating heat exchange fluid through the heating jacket. The reaction mixture then passed through another Research Control Valve to exit the reactor with a melt temperature maintained at not less than 31° C., and was introduced onto the screws of a Werner and Pfleiderer Corporation ZSK-30, vented, twin-screw extruder using a vent vacuum at the downstream (die end) port. The finished polymer was extruded through a strand die into a water bath at a through-put rate of about 5.8–6.4 kg/hr and then chopped into pellets.

The compositions and properties of the polyamide resins are summarized in Table 1, and those of the hexamethylene terephthalamide-caprolactam copolymers are summarized in Table 2. The mole ratios of the dicarboxylic acid units TA, IA and AA (terephthalyl, isophthalyl and adipyl), the diamine units HMDA and PMDA (hexamethylene diamine and 2-methylpentamethylene diamine) and lactam CAP (caprolactam) that make up the several polymers are given, together with the amounts of acid and amine endgroups and endcap (acetamide endgroups) as determined analytically for each of the resins and the I.V. (inherent viscosity) of the resins as produced. As is known in the art, 2-methylpentamethylene diamine may cyclize thermally to form 3-methylpiperidine; the level of endgroups containing this moiety was not determined.

Inherent Viscosity Determination

Polymer, 0.100 g, was dissolved in 25 ml of 60:40 phenol:tetrachloroethane at 120°–130° C. Efflux times of

TABLE 1

Polyamides

| Ex. No. | acid units (mole ratio) | | | amine units (mole ratio) | | acid end groups (µeq/g) | amine end groups (µeq/g) | acetic acid endcap (µeq/g) | I.V. (dl/g) |
|---|---|---|---|---|---|---|---|---|---|
| | TA | IA | AA | HMDA | PMDA | | | | |
| 1* | 65 | 25 | 10 | 100 | 0 | 67 | 43 | 61 | 1.00 |
| 2 | 65 | 25 | 10 | 100 | 0 | 52 | 45 | 61 | 1.04 |
| 3 | 65 | 25 | 100 | 100 | 0 | 40 | 33 | 77 | 1.09 |
| 4 | 65 | 25 | 10 | 100 | 0 | 26 | 67 | 77 | 0.99 |
| 5 | 75 | 0 | 25 | 77 | 23 | 73 | 29 | 46 | 0.97 |
| 6 | 75 | 0 | 25 | 77 | 23 | 37 | 39 | 61 | 1.08 |
| 7 | 75 | 0 | 25 | 77 | 23 | 24 | 66 | 61 | 0.98 |
| 8 | 75 | 0 | 25 | 77 | 23 | 14 | 91 | 46 | 0.99 |

Note: 1* is a commercially-produced polyphthalamide, obtained as Amodel® 1000 polyphthalamide resin from Amoco Polymers Inc.; analytical values reported are typical and are representative of the commercial product.

For the particular polymer molecular weights employed, it will be seen that as the carboxyl endgroup content is varied for a polymer type, the total of the endgroups falls in the same range of values, consistent with the polymer molecular weight (I.V.). Similar behavior is found for the caprolactam copolymers, summarized in the following Table 2.

TABLE 2

Hexamethylene Terephthalamide-Caprolactam Copolymers

| Ex. No. | TA moles | HMDA moles | CAP moles | acid end groups (µeq/g) | amine end groups (µeq/g) | acetic acid endcap (µeq/g) | (dl/g) |
|---|---|---|---|---|---|---|---|
| 9 | 37 | 37 | 26 | 71 | 32 | 46 | 0.96 |
| 10 | 37 | 37 | 26 | 45 | 60 | 46 | 0.93 |
| 11 | 37 | 37 | 26 | 39 | 71 | 46 | 0.90 |
| 12 | 37 | 37 | 26 | 19 | 102 | 46 | 0.88 |

Compounding and Molding

Examples 13–21.

The resins of Examples 1–4 were compounded with 33 wt % glass fiber (nominal) and, where indicated, with a copper stabilizer formulation containing a 10:1 weight ratio of potassium iodide:cuprous iodide, together with magnesium stearate mold release and talc nucleant. A magnesium stearate mold release agent was usually added to control formulations compounded without the stabilizer, such as C-1 through C-3.

Compounding was accomplished by dry-blending dried resin with the additives and feeding the blend to a 25 mm Berstorff single screw extruder. The glass fiber was fed to the extruder through a downstream port, either manually or with the aid of a single screw vent stuffer. The compounded polymer was extruded through a strand die into water, then chopped to form pellets.

After drying, the resin pellets were injection molded to form Type I tensile specimens, using a 75 ton Arburg twin screw injection molding machine.

Test Procedures

The molded articles were analyzed for inherent viscosity and for acetamide, acid, and amine endgroups, and were subjected to mechanical testing and thermal oxidative aging.

this solution and the solvent were determined using a Type 1C Cannon Ubbelohde Viscometer immersed in a constant temperature bath at 30° C.

The inherent viscosity in the units of dl/g was calculated from:

Inherent Viscosity=(ln (solution time/solvent time))/ concentration

Acetamide endgroup (acetic acid endcap) determination:

Polymer, 0.2 g (corrected for ash content), was dissolved in 12 ml of hexafluoroisopropanol by tumbling at room temperature over 1–2 days. After filtering or decanting from the insolubles, a $^{13}$C NMR spectrum was run on the solution using a Varian Unity 300 Spectrometer. The acetic acid endcap was determined by comparing the carbonyl resonance of the endcap to the sum of all carbonyl resonances.

Acid endgroup determination:

Polymer, 0.2 g (corrected for ash content), was dissolved in 6 to 8 ml of o-cresol at 100° C. After cooling, 4 to 6 ml of benzyl alcohol and 50 µl formaldehyde was added to the polymer solution. Potentiometric titration was done with 0.1N KOH in methanol.

Amine endgroup determination:

Polymer, 0.4 g (corrected for ash content), was dissolved in 12 ml of hexafluoroisopropanol at 50° C. After cooling, 0.1 ml water was added to the polymer solution. Potentiometric titration was done with 0.1N HCl in water.

Tensile Properties

Tensile testing was carried out according to standard ASTM test procedures. For thermal-oxidative aging, the tensile specimens were aged in a circulating air oven at the indicated temperature for varying periods, using sets of five tensile specimens for five to seven time periods. The tensile specimens were then tensile-tested at room temperature, and the data analyzed by fit to a cubic equation. The time period for 50% loss in tensile strength was determined by mathematical solution of the cubic equation.

The compositions of the molded articles and the analytical and aging test data are summarized in the following Table 3. The glass content, though targeted in the compounding operation to be 33 wt %, was found by determining the ash content to vary widely, falling in the range of from 27 wt % to 35 wt %.

TABLE 3

Compounded and Molded Glass-filled Polyamides: Thermal Stability

| | Resin | | | | | | Time to 50% tensile loss (hrs) | |
|---|---|---|---|---|---|---|---|---|
| Ex. No. | Ex. No. | Cu (ppm) | Acid end groups (µeq/g) | Amine end groups (µeq/g) | I.V. dl/g | Initial tensile str. Kpsi | 220° C. | 210° C. |
| C-1 | 1 | 268 | 51 | 42 | 0.92 | 31.8 | 805 | 1375 |
| 13 | 2 | 219 | 41 | 48 | 0.94 | 30.0 | 990 | 1615 |
| 14 | 3 | 336 | 35 | 44 | 0.93 | 28.6 | 970 | 1635 |
| 15 | 4 | 242 | 14 | 65 | 0.89 | 29.5 | 930 | 1720 |
| C-2 | 1 | 92 | 53 | 51 | 0.90 | 28.4 | 755 | 1090 |
| 16 | 2 | 86 | 41 | 47 | 0.92 | 31.5 | 700 | 1065 |
| 17 | 3 | 93 | 32 | 41 | 0.98 | 28.9 | 775 | 1120 |
| 18 | 4 | 94 | 13 | 61 | 0.94 | 27.7 | 1010 | 1490 |
| C-3 | 1 | 1* | 54 | 39 | 1.01 | 27.9 | 335 | 530 |
| 19 | 2 | 3* | 42 | 55 | 0.88 | 29.1 | 475 | 650 |
| 20 | 3 | 5* | 38 | 41 | 0.93 | 29.1 | 460 | 690 |
| 21 | 4 | 4* | 25 | 69 | 0.92 | 28.0 | 475 | 755 |

Notes: *no copper stabilizer added; by analysis the copper content of the specimens was in the range of from 1–5 ppm.

It will be apparent from a comparison of the stability data for control example C-3 and Examples 19–21 that the thermal oxidative stability of a polyamide without copper stabilizer is little affected by the level of acid endgroups, with only modest improvement realized in the less demanding (21° C.) environment. When high levels of copper stabilizer are employed, reduction in acid endgroups affords a marked increase in thermal stability; compare control example C-1 with Examples 13–15. The effect of acid endgroup level on thermal stability is more pronounced at lower copper levels; compare control example C-2 with Examples 16–18.

Reducing copper level does lower thermal stability; compare control examples C-1, C-2 and C-3, and compare Examples 13, 16 and 19. However, by lowering the endgroup level, the effect of a reduction in copper level may be offset; compare the thermal stabilities of examples having the same 92–94 ppm copper, C-2 (53 µeq/g acid endgroups) and Example 17 (32 µeq/g) with Example 18 (13 µeq/g).

It will also be seen that formulations with very low levels of acid endgroups, Examples 15 and 18, have very much improved thermal oxidative stability, whether stabilized using a copper stabilizer level of about 242 ppm, Example 15 (14 µeq/g), or a much lower level of 94 ppm, Example 18 (13 µeq/g).

Examples 22–31.

Additional formulations were prepared using the resins of Examples 5–8. The glass fiber-filled formulations of Examples 22–31, summarized in the following Table 4, were compounded and injection molded substantially following the methods and procedures described above for control examples C-1 through C-3 and Examples 13–21.

TABLE 4

Compounded and Molded Terephthalamide Copolymers: Thermal Stability

| | Resin | | | | | | Time to 50% tensile loss (hrs) | |
|---|---|---|---|---|---|---|---|---|
| Ex. No. | Ex. No. | Cu (ppm) | Acid end groups (µeq/g) | Amine end groups (µeq/g) | I.V. dl/g | Initial tensile str. Kpsi | 220° C. | 210° C. |
| 22 | 5 | 221 | 59 | 37 | 0.92 | 31.8 | 795 | 1335 |
| 23 | 6 | 255 | 28 | 44 | 0.95 | 26.0 | 1115 | 1700 |
| 24 | 7 | 257 | 20 | 62 | 0.90 | 30.8 | 1225 | 1865 |

TABLE 4-continued

Compounded and Molded Terephthalamide Copolymers: Thermal Stability

| | Resin | | | | | | Time to 50% tensile loss (hrs) | |
|---|---|---|---|---|---|---|---|---|
| Ex. No. | Ex. No. | Cu (ppm) | Acid end groups (µeq/g) | Amine end groups (µeq/g) | I.V. dl/g | Initial tensile str. Kpsi | 220° C. | 210° C. |
| 25 | 8 | 293 | 0 | 82 | 0.91 | 32.0 | 1235 | 1930 |
| 26 | 5 | 137 | 58 | 39 | 0.89 | 31.3 | 740 | 1185 |
| 27 | 6 | 153 | 26 | 47 | 0.94 | 24.6 | 945 | 1525 |
| 28 | 7 | 152 | 17 | 69 | 0.89 | 30.7 | 940 | 1650 |
| 29 | 8 | 151 | 0 | 88 | 0.96 | 25.3 | 1210 | 1910 |
| 30 | 5 | 3* | 69 | 35 | 0.91 | 30.9 | 455 | 675 |
| 31 | 6 | 2* | 39 | 41 | 0.89 | 29.4 | 445 | 685 |

Notes: *no copper stabilizer added; copper content by analysis = 2–3 ppm.

It will be seen from the thermal oxidative stability data for Examples 30 and 31 that the thermal stability of the copolyterephthalamide formulation without copper is not much affected by acid endgroup level, in contrast with the findings by Lanska for lactams, as discussed herein above. As shown by Examples 22 and 26, thermal stability for these high temperature polyamides is again significantly improved by the further addition of copper stabilizer, even for high levels of acid endgroups.

Reducing the level of acid endgroups to levels well below about 40 µeq/g, Examples 23–25 and 27–29, is seen to provide a significant improvement in thermal oxidative stability. Levels of acid endgroups below about 30 µeq/g, Examples 23, 24, 27 and 28, significantly improve thermal oxidative stability. In the substantial absence of acid endgroups the copper level may be reduced by half without significantly affecting the excellent thermal stability of these formulations; compare Examples 25 and 29.

After twenty-four hours of aging at 220° C., one specimen of each of the above polymers was removed and the soluble interior analyzed for endgroups. In contrast to the work of Lanska with lactam polymers at lower oxidizing temperatures, the polymers with a large excess of acid groups, Examples 22, 26, and 30, underwent a substantial reduction in the number of acid endgroups during this thermal aging, such that the stoichiometry shifted in the direction of being balanced.

Examples 32–41.

Additional formulations were prepared using the hexamethylene terephthalamide-caprolactam copolymer resins of Examples 9–12. The glass fiber-filled formulations of Examples 32–41, summarized in the following Table 5, were compounded and injection molded substantially following the methods and procedures described above for control examples C-1 through C-3 and Examples 13–21.

TABLE 5

Compounded and Molded Phthalamide-Caprolactam Copolymers: Thermal Stability

| | Resin | | | | | | Time to 50% tensile loss (hrs) | |
|---|---|---|---|---|---|---|---|---|
| Ex. No. | Ex. No. | Cu (ppm) | Acid end groups (µeq/g) | Amine end groups (µeq/g) | I.V. dl/g | Initial tensile str. Kpsi | 220° C. | 210° C. |
| 32 | 9 | 250 | 56 | 46 | 0.89 | 30.8 | 960 | 1125 |
| 33 | 10 | 196 | 34 | 62 | 0.89 | 30.9 | 1120 | 1635 |
| 34 | 11 | 246 | 18 | 71 | 0.92 | 30.7 | 1340 | 1565 |

TABLE 5-continued

Compounded and Molded Phthalamide-Caprolactam Copolymers: Thermal Stability

| | Resin | | Acid end | Amine end | | | Time to 50% tensile loss (hrs) | |
|---|---|---|---|---|---|---|---|---|
| Ex. No. | Ex. No. | Cu (ppm) | groups (µeq/g) | groups (µeq/g) | I.V. dl/g | Initial tensile str. Kpsi | 220° C. | 210° C. |
| 35 | 12 | 231 | 2 | 100 | 0.84 | 29.6 | 1570 | 2090 |
| 36 | 9 | 121 | 54 | 39 | 0.93 | 31.7 | 840 | 1075 |
| 37 | 10 | 113 | 20 | 60 | 0.94 | 32.4 | 935 | 1265 |
| 38 | 11 | 127 | 22 | 67 | 0.92 | 30.0 | 1175 | 1480 |
| 39 | 12 | 110 | 0 | 98 | 0.90 | 31.2 | 1330 | 1620 |
| 40 | 10 | 2 | 46 | 60 | 0.89 | 29.5 | 685 | 800 |
| 41 | 11 | 1 | 40 | 65 | 0.89 | 28.9 | 735 | 935 |

Notes: *no copper stabilizer added; copper content by analysis = 2 ppm.

It will be apparent from a comparison of the stability data for Examples 32–35, and again for Examples 36–39, that reducing the acid endgroup levels to well below 40 µeq/g provides significant improvement in the thermal oxidative stability of compositions with copper stabilizer for copolyamides containing caprolactam segments. At levels of acid endgroups below about 30 µeq/g, Examples 34 and 35 and 37–39, the thermal oxidative stability of these compositions is still further improved. In the substantial absence of acid endgroups the level of copper may be substantially reduced, possibly by as much as half, while retaining a high degree of thermal oxidative stability. Compare Example 39 with Examples 32–34.

Formulations comprising a copper stabilizer and a partially aromatic polyamide having a low content of carboxylic acid endgroups are thus seen to be significantly more thermal oxidatively stable than comparable formulations comprising polyamides according to the art wherein the carboxylic acid endgroups are in excess of 40 µeq/g. The improvement in thermal oxidative stability observed for partially aromatic polyamides with, reduced level of carboxylic acid endgroups according to the invention will be most apparent for injection molded articles and extruded goods. Partially aromatic polyamides with a low content of carboxylic acid endgroups will also be useful in the production of film and in melt spinning filament and fiber, particularly when further stabilized and compounded according to the teachings of the fiber and filament art. Film and fiber have a high surface area per unit weight and are more succeptable to thermal oxidative attack, becoming more rapidly degraded than molded articles, extruded profiles and the like when used in severe environments and at elevated temperatures. The improvement in thermal stability seen in molded articles when the level of carboxylic acid endgroups in the polyamide is reduced thus may not be readily apparent for fiber and film comprising such polyamides.

The invention will thus be seen to be a composition comprising a high temperature, partially aromatic polyamide and more preferably a polyamide containing aliphatic diamine terephthalamide units, said polyamide having less than about 40 µeq/g, preferably less than about 30 µeq/g, still more preferably less than about 20 µeq/g acid endgroups, together with a copper-containing stabilizer. The invention further contemplates a method for improving the thermal oxidative stability of copper-stabilized, partially aromatic polyamides by reducing the acid endgroup content of the polyamide to less than about 40 µeq/g, preferably less than about 30 µeq/g, still more preferably less than about 20 µeq/g.

Although the invention has been described and illustrated by way of specific embodiments set forth herein, still further modifications and variations will be readily apparent to those skilled in the resin formulating and composite fabricating art. For example, the invented compositions may further comprise, in addition to the fillers and reinforcement as set forth herein before, conventional additives such as pigments, dyes, lubricants, processing aids, light and heat stabilizers, and the like, as well as impact modifiers and tougheners known for use with high temperature polyamides and particularly for polyamides. The invented compositions may be further compounded to form blends with additional polymers and resins as is well known in the art. Polymers that may be particularly suitable for use in such blends include the variety of polymers classified as engineering thermoplastics such as, for example, aliphatic polyamides such as nylon 6, nylon 6,6, nylon 4,6, nylon 11, nylon 12 and the like; polyesters such as aromatic polycarbonates, polyarylates, liquid crystalline polyesters and the like; and polyaryl ethers including polysulfone resins, polyphenylene oxide resins, polyaryl ketones and the like.

These and other such variations and modifications will be readily apparent to those skilled in the polymer arts and thus are contemplated as lying within the scope of the invention which is defined solely by the appended claims.

I claim:

1. An injection moldable composition comprising (a) a partially aromatic polyamide containing from about 0 to about 40 µeq/g carboxylic acid endgroups, said polyamide comprising aliphatic diamine terephthalamide units represented by the following structural formula:

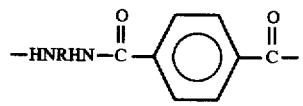

wherein R comprises at least one $C_4$–$C_{14}$ aliphatic hydrocarbyl radical; and (b) from 0.01 to about 2 wt % of a copper-containing thermal stabilizer formulation comprising an alkali metal halide and a copper (I) halide in a weight ratio of from about 2.5:1 to about 20:1.

2. The composition of claim 1 wherein said thermal stabilizer formulation comprises potassium iodide and copper(I) iodide.

3. The composition of claim 1 wherein said polyamide contains from about 0 to about 30 µeq/g carboxylic acid endgroups.

4. The composition of claim 1 wherein said polyamide contains from about 0 to about 20 µeq/g carboxylic acid endgroups.

5. The composition of claim 1 further comprising from about 5 to about 60 wt % filler.

6. The composition of claim 5 wherein said filler is glass fiber.

7. An injection moldable composition comprising (a) a partially aromatic polyamide containing from about 0 to about 40 µeq/g carboxylic acid endgroups, said polyamide comprising units represented by the following structural formulas:

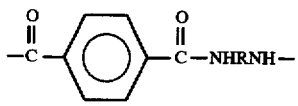

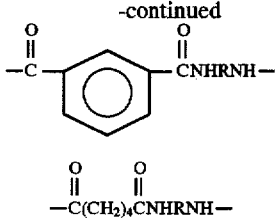

-C(CH₂)₄CNHRNH—   C wherein R comprises at least one $C_4$–$C_{14}$ aliphatic hydrocarbyl radical and wherein the mole ratio of the units A, B and C is from about 40–100:30–0:60–0; and (b) from 0.01 to about 2 wt % of a copper-containing thermal stabilizer formulation comprising an alkali metal halide and a copper (I) halide in a weight ratio of from about 2.5:1 to about 20:1.

8. The composition of claim 1 wherein R comprises a mixture of hexamethylene and 2-methylpentamethylene radicals.

9. The composition of claim 1 further comprising units derived from caprolactam.

10. An injection molded article comprising the composition of claim 1.

11. In an injection moldable composition comprising a partially-aromatic polyamide and a copper-containing thermal stabilizer, the improvement wherein the partially-aromatic polyamide contains from about 0 to about 40 μeq/g carboxylic acid endgroups.

* * * * *

UNITED STATES PATENT AND TRADEMARK OFFICE
CERTIFICATE OF CORRECTION

PATENT NO.: 5,763,561
DATED: June 9, 1998
INVENTOR(S): Robert G. Keske

It is certified that error appears in the above-identified patent and that said Letters Patent is hereby corrected as shown below:

| Col. | Line | | |
|---|---|---|---|
| 7 | 57 | "µq/g" should read --µeq/g-- | |
| 10 | 23 | "(H3PO3)" should read --($H_3PO_3$)-- | |
| 11 | | Table 1, Ex. No. 3, AA, reads "100" should read --10-- | |
| 11 | | Table 2, headings, final column (after "acetic acid endcap") should read --I.V.-- | |
| 12 | 30 | "(In (solution" should read --(ln (solution-- | |
| 13 | 28 | "(21°C.)" should read --(210°C.)-- | |
| 14 | 40 | "lactarn polymers" should read --lactam polymers-- | |

Signed and Sealed this

Fifteenth Day of June, 1999

Attest:

Q. TODD DICKINSON

Attesting Officer

Acting Commissioner of Patents and Trademarks